United States Patent Office 3,287,472
Patented Nov. 22, 1966

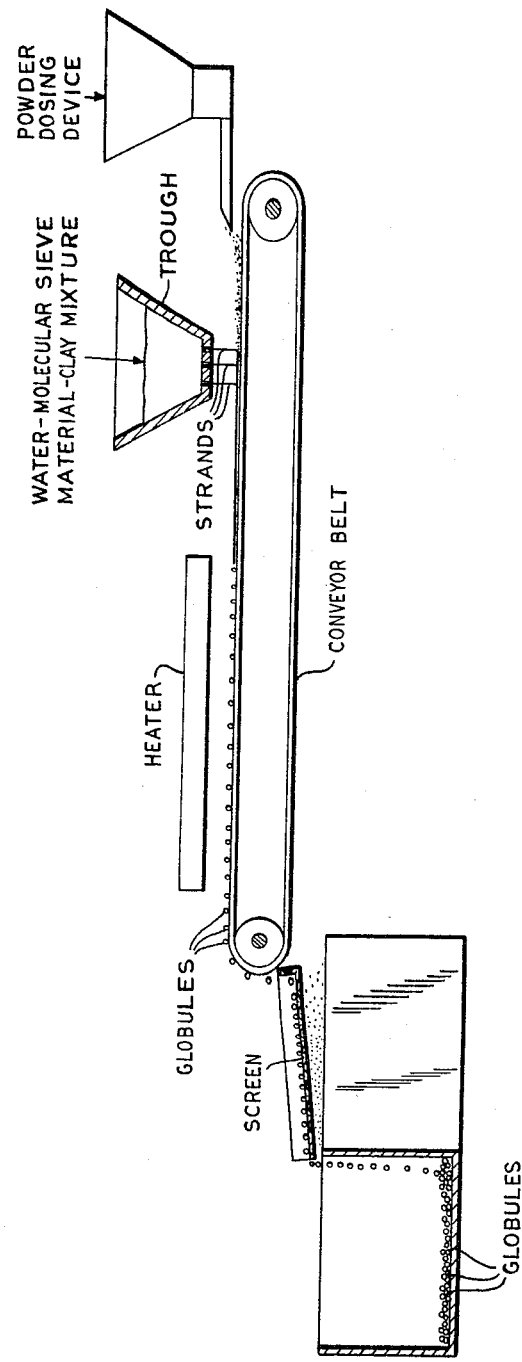

3,287,472
METHOD OF MAKING MOLECULAR SIEVES
Friedrich Wolf, Leipzig, Helmut Fürtig, Jessnitz, and Paul Blühmke and Dieter Borchhardt, Wolfen, Germany, assignors to VEB Farbenfabrik Wolfen, Wolfen, Kreis Bittenfeld, Germany
Filed Apr. 13, 1964, Ser. No. 360,475
2 Claims. (Cl. 264—13)

The present invention relates to a method of making spherically shaped bonded zeolitic molecular sieves. German Patent No. 1,040,005 teaches a method of making bonded molecular sieves, using clay as the bonding agent. In accordance with the method disclosed therein, mixtures of the molecular sieve and clay, with the addition of a certain amount of moisture sufficient to render the materials plastic, are formed into shaped bodies by extrusion and cutting. These bodies, after drying, are revolved in a mixing drum until they are broken up into spherical pieces of the desired size. After removal of dust, the shaped bodies can be activated and hardened by firing.

This method has some drawbacks inasmuch as large amounts of dust are formed when the dried particles are revolved. The dust must be separated, again made into a paste, and re-formed. Furthermore, the bodies thus obtained do not possess an accurate spherical shape, but are elliptic or kidney-shaped, the size of the grain varying greatly.

It has been also suggested to make wear-resistant, spherical, bonded molecular sieves by the so-called oil-drop method. According to this method, the zeolitic powder is mixed into a paste with a sodium silicate solution and ejected drop by drop from a nozzle, if desired under pressure. The drops are collected in a layer of oil, below which a layer of a hardening salt solution is provided which is circulated in a closed cycle. After remaining in the solution for a certain period, the globules are screened, washed, dried, leached to remove the electrolyte, dried once more and subsequently fired.

Although the spherical bodies or globules produced according to the above method meet the requirements as to their resistance to abrasion and adsorption capacity, their pouring weight of only 450 g./l. is too low for certain purposes, and this results in a relatively low adsorption capacity per volume unit.

It is the object of the present invention to provide a method of producing spherically shaped, bonded molecular sieves which combine a proper resistance to abrasion and satisfactory adsorption capacity with a flawless spherical shape and a sufficiently high pouring weight.

This object is achieved according to the invention by letting a suspension consisting of molecular sieve and clay in a liquid, preferably water, enter drop by drop in a powdery medium or by injecting the suspension into the same. The drops will then be enveloped immediately by a thin powder layer and will, owing to their surface tension, be shaped into globules without moistening any other body. Then the globules will be dried in air or in a drying chamber at a temperature of about 100° C., subsequently fired at 400° to 700° C., and finally separated by screening into fractions of the desired size. According to the method of operation, a more or less large granule spectrum of a 0.3 to 4 mm. particle diameter will be obtained. The desired main fraction can be increased up to 80%. The pouring weight of these globules will, depending on the fraction, range from 570 to 600 g./l.

Clays of the most varied types can be used for producing the aforementioned suspension, preferably however such which, as those of the bentonite type, are apt to prevent bridge formation at a certain moisture content which is characteristic for synthetic molecular sieves. The ratio of the bonding agent, as e.g. that of the clay type, can be adjusted to any desired amount; it will normally be of an order of 20% by weight calculated on the dry finished product.

For producing the drops from the molecular-sieve-clay suspension, a large number of different devices can be used which may be of various shapes and have considerable capacity; we mention, e.g. dropping, centrifugal, sprayer or nozzle mechanisms. A sprayer constructed according to the principle of a plate atomizer proves to be particularly simple to operate and dependable in operation. By changing the rate of revolutions of the plate, the size of the globules can readily be varied.

As powders serving for receiving the drops, the following may be suitable: kieselgur, finely dispersed silicic acids, molecular sieve powder, clay powder, ion exchanger resin powder, flour mill powder, and particularly carbon powder. The carbonaceous powders, onto which the suspension is being sprayed, additionally afford the particular advantage of burning off without residue in the course of the subsequent process of firing.

Should the powder be sprayed onto a rotating disc or a conveyor belt by means of a vibrating screen or the like, then the suspension can be constantly sprayed onto a new powder layer. Since the main objective is to prevent the globules from being moistened on the support, it is sufficient if the powder layer will be of a filmy thinness. In continuous operation, e.g. with a conveyor belt sprinkled with powder, drying can be effected on the conveyor proper and the globules enveloped in powder can at the end be directly separated therefrom. This novel method, called powder-drop-process, is substantially simpler in its technology and less exposed to breakdown of operation than is the oil-drop method and it yields globules having a considerably higher density. In addition thereto the whole shaping process requires a substantially shorter time of operation and it is particularly advantageous for being applied to large-scale manufacture.

By using clays which do not alter the intercrystalline properties of the molecular sieve powder, where the tendency to bridge formation is consequently maintained, the production of bonded molecular sieve globules becomes even more easy.

According to that process, which is also an embodiment of the present invention, and which is called powder flowing method, only half of the conventional amount of liquid, e.g. $H_2O$, is to be added to the molecular sieve and clay mixture, whereby the condition of bridge formation or of flowing is being reached. Under mechanical stress, the mixture will behave like a liquid; gravity alone will make it flow; in a state of rest, it will exhibit the characteristics of a solid body. When this mass is made to flow out from apertures of 2 to 10 mm. diameter onto a support covered with powder, e.g. a conveyor belt, the stretched filament will, as a result of surface tension, become divided into a chain of globules of equal size. The above mentioned media will serve as powder, namely kieselgur, finely dispersed silicic acids, zeolitic powder, carbon powder, and so on. The size of the discharge opening as well as the consistency of the mass are the determining factors for the size of the resulting globules. The range of globules thus obtained is very narrowly limited, e.g. from 1.5 to 2.0 mm. diameter. There are practically no longer any oversized or undersized granules.

This method is even simpler and more effective than the powder-drop process because it permits to dispose adjacently a great number of openings in a trough spaced apart at a distance of 5 to 10 mm. The bulk density of the globules obtained is of the order of 650 to 680 g./l., which results in these molecular sieves having a very good volume capacity, as it is required for industrial purposes. Drying on the support covered with powder is very quickly effected because the water content is only half the amount compared to the powder spray method. Owing to high density the globules possess a particular resistance to abrasion and they do not tend to dust formation at the outer surface, as is the case with all other spherical granules.

The globules produced through either of the mentioned methods according to the invention lend themselves to being coated with further hardness-increasing bonding layers by methods known per se, such as, for example, in the dragee process.

The submitted flow sheet illustrates the continuous production of molecular sieves in accordance with the invention. A conveyor belt is covered with a powder medium and the mixture of water, molecular sieve material and clay which is fed into a trough passes through openings in the bottom of the trough in the form of strands onto the conveyor belt where globules are formed. The globules are dried by heating and separated from the adhering powder.

*Example 1.—Powder-drop process*

1 kg. of molecular sieve powder containing 15% water of hydration and 210 g. of finely triturated bentonite clay are made into a paste with 1600 ml. of water and thoroughly homogenized. This viscous mixture is then fed into a plate-atomizer. By adjusting the r.p.m. of the plate, the drop size and globule size can be adjusted. A rotating square box of length of 1.6 mm. and a height of 10 cm. is located underneath the atomizer. The r.p.m. is of the order of about 15 to 20.

Above the box a powder dispenser is disposed for continuously sprinkling the globules with carbon powder in order to prevent the next overlying layer from becoming fused with the lower layer. The powder dispensing is very sparse and there is but a slight drop between the level of the dispenser and the support, whereby it is possible to avoid dust development. The operation is continued until a layer of an 8 cm. height will pile up in the box. The globules will dry in the carbon. By applying a tipping device, the box can be emptied into a barrel. The globules will be separated from the carbon powder on a closed vibrating screen and will subsequently be activated at a temperature of 650° to 700° C. for 4 to 6 hours.

Instead of a rotary disc, a rotary drum, a rotary cylinder or a continuous conveyor belt can also be used.

The globules having a diameter of 1.5 to 2.0 mm. will have a bulk weight of 500 g./l. and an adsorption capacity of 19.4 g. water per 100 g. of dry weight at $p_{H_2O}=0.6$ mm. Hg and 20° C.

*Example 2.—Powder-flow method*

1 kg. of molecular sieve with a water content of 15% by weight and 210 g. of finely ground "Brandis" * clay

* "Brandis" clay, a clay occurring in Brandis, a little town near Leipzig.

are made into a paste with 850 ml. water and thoroughly homogenized. As a pouring device, a V-shaped trough is used, having a length of 32 cm. comprising 30 boreholes of 4 mm. diameter each in a 2 cm. wide bottom, the holes being spaced apart at a distance of 10 mm. The trough is disposed above a conveyor belt which is 40 cm. wide and 6 m. long and moves at a rate of 30 cm./s. The latter must be adjusted to the discharge velocity of the mass flowing out of the trough. In front of the trough a carbon-powder dispenser is disposed which can be set to dispense even much more sparingly than in Example 1 with the powder-drop method. Upon pouring the mass into the trough, the flowing starts directly and will continue without interruption until the trough is completely emptied. On the conveyor belt, globules of a diameter of 1.5 to 2 mm. will be formed. They will be dried through a battery of infrared radiators right on the moving belt and at the end of the operation they will become separated from the carbon powder by means of a screen chute. Complete desiccation will be effected in a drying oven at a temperature of 100° C. and firing at 400° C., for 8 to 10 hours.

The globules obtained will have a bulk weight of 660 g./l. and an adsorption capacity of 19.3 g. $H_2O$ per 100 g. dry weight at $p_{H_2O}=0.6$ mm. Hg and at 20° C.

What is claimed is:

1. Method of making spherically shaped bonded zeolitic molecular sieves using clay as bonding agent, which comprises mixing water, molecular sieve material and clay in such proportions that a viscous mixture is formed which is in flowing condition wherein the mixture behaves like a liquid under slight mechanical stress or gravity, and like a solid body upon impact and in a state of rest; and causing the thus formed viscous mixture to flow through apertures of about 2–10 mm. diameter at a rate such that continuous strands flow through said apertures onto a moving surface covered with a pulverulent medium, the speed of movement of said surface being such that the strands after reaching the same are divided into globules which are covered by the pulverulent medium, whereby independent globules of substantially constant diameter are formed.

2. Method according to claim 1 wherein the formed globules are continuously dried, separated from the adhering pulverulent medium and further desiccated by firing at temperatures of about 400–700° C.

References Cited by the Examiner

UNITED STATES PATENTS

| | | | |
|---|---|---|---|
| 1,294,909 | 2/1919 | Howell | 264—8 |
| 2,872,719 | 2/1959 | Brassfield et al. | 264—13 |

ROBERT F. WHITE, *Primary Examiner.*

F. S. WHISENHUNT, J. R. HALL,
*Assistant Examiners.*